United States Patent [19]

Miura

[11] 4,198,0[?]
[45] Apr. 15, 19[?]

[54] SIMPLIFIED RECORD PLAYER

[75] Inventor: Yasuyuki Miura, Machida, Japan

[73] Assignee: Ozen Co., Ltd., Machida, Japan

[21] Appl. No.: 10,262

[22] Filed: Feb. 7, 1979

[30] Foreign Application Priority Data

Dec. 29, 1978 [JP] Japan .................. 53-162332

[51] Int. Cl.² .................. G11B 17/06; A63H 3/33
[52] U.S. Cl. .................. 274/1 A; 274/15 R
[58] Field of Search .............. 274/1 A, 7, 9 R, 13 R, 274/14, 15 R

[56] References Cited

U.S. PATENT DOCUMENTS

| | | | |
|---|---|---|---|
| 3,401,942 | 9/1968 | Strauss | 274/1A |
| 3,589,735 | 6/1971 | Watanabe | 274/1 A |
| 3,992,016 | 11/1976 | Watanabe | 274/1 A |
| 4,027,887 | 6/1977 | Watanabe | 274/1 |

*Primary Examiner*—John W. Shepperd
*Attorney, Agent, or Firm*—Irving M. Weiner; Pamela Burt; Melvin Yedlin

[57] ABSTRACT

A record player having a tone arm which returns aut[o]matically to the starting point of sound reproduction, which position the tone arm pushes down, by means [of] a spring for imparting a stylus force, a movable conta[ct] of a switch connected to a power source so as to mo[ve] the movable contact blade away from engagement wi[th] a fixed electrical contact blade. The movable conta[ct] blade and the fixed contact blade are placed in ver[ti]cally opposed relation with each other at the starti[ng] point, in the same direction as that of the stylus forc[e]. Thus, the fixed contact blade supports and moderates [the] downward movement of the tone arm.

7 Claims, 5 Drawing Figures

SIMPLIFIED RECORD PLAYER

BACKGROUND OF THE INVENTION

1. Field of the Invention

The present invention relates to a simplified record player. More particularly, the invention relates to a simplified construction incorporated in a record player wherein an interrupting switch used for terminating sound reproduction is utilized to appropriately cushion or damp rapid motion and excessive stylus force exerted by a stylus spring at the time when a tone arm is automatically returned to its initial playing point. Due to such simplified construction, any disagreeable harsh noises can be eliminated, and at the same time, spoilage of record grooves, deterioration of the stylus itself, and failures such as poor starting, etc., are completely obviated.

2. Description of the Prior Art

Illustrative of prior art attempts in the field of record players are: the "GAME DEVICE" disclosed in U.S. Pat. No. 2,893,735 issued in 1959 to Tranter, Jr.; the "SIMPLE SOUND REPRODUCING DEVICE" disclosed in U.S. Pat. No. 3,467,393 issued in 1969 to Kuwayama; the "MAGNETICALLY INDEXED SPINNER" disclosed in U.S. Pat. No. 3,492,001 issued in 1970 to Coffey, Sr.; the "PHONOGRAPH TOY HAVING AN IMPROVED SPEAKER CONE" disclosed in U.S. Pat. No. 3,547,448 issued in 1970 to Chang; the "AUDIBLE GAME" disclosed in U.S. Pat. No. 3,779,552 issued in 1973 to Buck; the "SOUND-PRODUCING MIRROR TOY" disclosed in U.S. Pat. No. 4,072,314 issued in 1978 to Rosen et al; the "TOY PHONOGRAPH" disclosed in U.S. Pat. No. 3,672,688 issued in 1972 to Hill; and the "IMPROVED GAME OF CHANCE" disclosed in Australian Pat. Specification No. 164,265 published in 1955. A simplified record player in which a speaker and a sound transfer member are mounted in a casing of the player in a cantilever fashion and the sound transfer member is urged by a spring for imparting a stylus force is well known. A tone arm, when automatically returned to the starting or initial position, acts to urge the movable contact of a switch means so as to move it away from engagement with a fixed contact. Such well known construction is disclosed, for example, in Japanese Laid-Open (Unexamined) Patent Publication No. 105803/1977.

Another type of record player wherein a speaker and a sound transfer member are fixed to a casing and a turntable is able to be moved vertically is also known. A switch is moved to an "ON" or "OFF" position by a vertical motion correlated with the movement of the turntable in the same direction as that of the stylus force. Such type of record player is disclosed in Japanese Patent Publication Nos. 3705/75 and 32271/70. However, record players of this latter type do not provide a tone arm which automatically reverts back to its initial position when playing is terminated, and at such position no adjustment of spring forces of the tone arm and return spring is required. Accordingly, such construction differs essentially from the former type wherein the switch is turned OFF by a force exerted by the return motion of the tone arm.

In the latter type of record player, rotation of the turntable becomes unavoidably slow when the tone arm is situated at a position radially distant from the center of the record, and rotation becomes faster as it approaches the center during playing.

In order to keep the rotational speed of the record disc uniform, at least the sound transfer member must unfixed, but should be urged by a spring for exerti stylus force, which force becomes larger as the to arm approaches the center of the record disc.

In view of the foregoing characteristics, a reco player of the former type is considered to be preferal to that of the latter type. A simplified record player this former type is being marketed on a considerat wide scale, however, the following problems therew remain to be solved:

(1) Because the sound transfer member is carried at one end in a cantilever fashion and is urged by stylus force spring, upon return of the tone arm t stylus strongly impinges upon a record disc unde high spring force of the stylus force spring. Thus not only generates an unpleasant shock noise b also damages the record disc.

(2) A resilient force exerted by the return spring the tone arm moves the movable contact agaii the resilient force of the contact. In this type device, a return spring should not have a stro: resilient force, such that the reproducing stylus always kept in stable engagement with the reco grooves during sound reproduction. According in order that the tone arm may be able to move t movable contact by means of the force of its retu spring, the spring force of the movable conta must be fairly weak. This naturally gives rise to very weak contact force between the movat contact and the fixed contact which is likely to accompanied by frequent variation in the electric resistance between the two mating contacts, ai rotation of the record disc thus becomes irregul:

(3) At the starting point of sound reproduction, wh the sound reproduction stylus is positioned at radially outer part of the record disc, excessi stylus force is often exerted thereon to yield a lar moment of force which results in poor starting the record player.

(4) The tone arm sometimes reverts to the startii point halfway along its course, where the sou transfer member has been scooped up by the ca: When this occurs, the movable contact blade ai the fixed contact blade are opposed against ea other in the horizontal direction as in the prior a construction, and the tone arm pushes and detach the movable contact blade from the fixed conta blade so as to interrupt the power supply to t electric motor. In this state, there is the disadva tage that because the sound transfer member is ke halfway on the cam so that no stylus force is ii parted to the pickup, the stylus does not enga with the record groove and the tone arm its cannot move while the start switch is ON. Furth the start switch has to be kept ON until the styl force is imparted by depressing the sound trans member by further rotation of the cam.

(5) Because the spring force of the movable conta has been weak, even a slight shock during the pla ing sometimes causes the contact switch to swit OFF.

The present invention is constructed so as to co pletely eliminate the above-mentioned drawbacks of t conventional constructions.

SUMMARY OF THE INVENTION

The present invention provides a simplified record player including a casing having a sound transfer member cantilever-mounted thereon, and stylus force spring means resiliently cooperating with the sound transfer member. A tone arm is pivotably mounted at one end thereof to the casing, and has a pickup supported by the other end thereof. The pickup is provided with a stylus, and the tone arm is disposed under the sound transfer member, with an upper face of the pickup being adapted to slidably contact the lower face of the sound transfer member. The stylus is adapted to be resiliently urged by the sound transfer member to engage with sound grooves of a record disc, and a cam is disposed substantially at the rotational center of the record disc. The cam cooperates with the sound transfer member to upwardly lift the sound transfer member when the pickup reaches the terminal point of sound reproduction of the record disc, and to permit the stylus to disengage from the sound grooves and to return back to the starting point of sound reproduction. An electric power source and an electric motor for driving the record disc are connected by an electric circuit, and a switch is provided which cooperates with the pickup so as to be opened by the pickup when the pickup returns to the starting point, to interrupt an electrical connection in the electric circuit. The switch includes a fixed contact and a movable contact disposed in substantially vertically opposed relation against each other, substantially in the same direction as that of the stylus force. The movable contact and the tone arm operatively communicate with each other such that the tone arm is disposed above the upper face of the movable contact when the tone arm is returned to the starting point and the tone arm pushes the movable contact downwardly against a spring force, away from engagement with the fixed contact so as to interrupt the electrical connection and moderate rapid impinging of the stylus on the record disc.

An object of the present invention is to moderate or damp any harsh noise caused by shock when the tone arm returns back to a sound-reproduction starting position and a needle or stylus force is suddenly exerted upon a record disc.

Another object of the present invention is to enable the movable contact of the switch means, which controls the rotation of a motor used in a simplified record player, to contact the fixed contact with sufficient force such that uneven rotation of the record disc due to variations in electrical resistance can be obviated.

A further object of the present invention is to prevent excessive moment of force from being imparted to the record disc to reduce rotational torque of the record disc which may result in poor starting of the record player.

A still further object of the present invention is to enable the sound reproduction to start without requiring any manual holding of a start switch for a long period of time, as well as to prevent malfunctioning of the switch due to any slight shock during play.

According to the present invention, both a fixed contact and a movable contact which cooperate to close or open an electrical circuit are provided at the starting point side of the reproduction, and are in vertically opposed relation in the same direction as that of the stylus force. The tone arm, having returned to its starting point of sound reproduction, takes a position over the movable contact, and the sound transfer member is lowered upon the tone arm at such position by the force of a stylus spring. Further, the movable contact is pushed downwardly so as to urge it to move downwardly away from engagement with the fixed contact. In this manner, both the fixed contact and the movable contact are placed in vertically opposed relation to each other in the same direction as that of the stylus force and the tone arm, having returned to the starting position, takes its proper place above the movable contact. Accordingly, if the sound transfer member and/or the speaker are rapidly descended by the stylus force spring, the movable contact will first sustain them, and the tone arm as well, and then allow the stylus of the tone arm to engage with the record disc in a cushioned or damped manner. Consequently, undesirable noise normally encountered in this type of record player can be substantially damped.

Because the spring force of the movable contact can be and should be selected to be sufficient to suppress or damp the force of the stylus force spring, the resilient force of the movable contact can be made strong regardless of the extent of the force of the return spring of the tone arm. Thus, strong and firm contact pressure with respect to the fixed contact is ensured. Also, irregular variations of electrical resistance at the contact surface between the two mating contacts is eliminated, and thus sufficiently uniform rotation of the record disc can be attained.

Further, because the sound reproducing stylus is sustained by the movable contact and is prevented from engaging with the record disc under excessive pressure, poor starting of the record player is prevented.

The invention also reduces the possibility of interruption of the power supply during the course where the cam scoops up the sound transfer member and reduces the possibility of a malfunction of the switch means caused by a shock during playing.

DETAILED DESCRIPTION OF PREFERRED EMBODIMENTS

Figure 1:
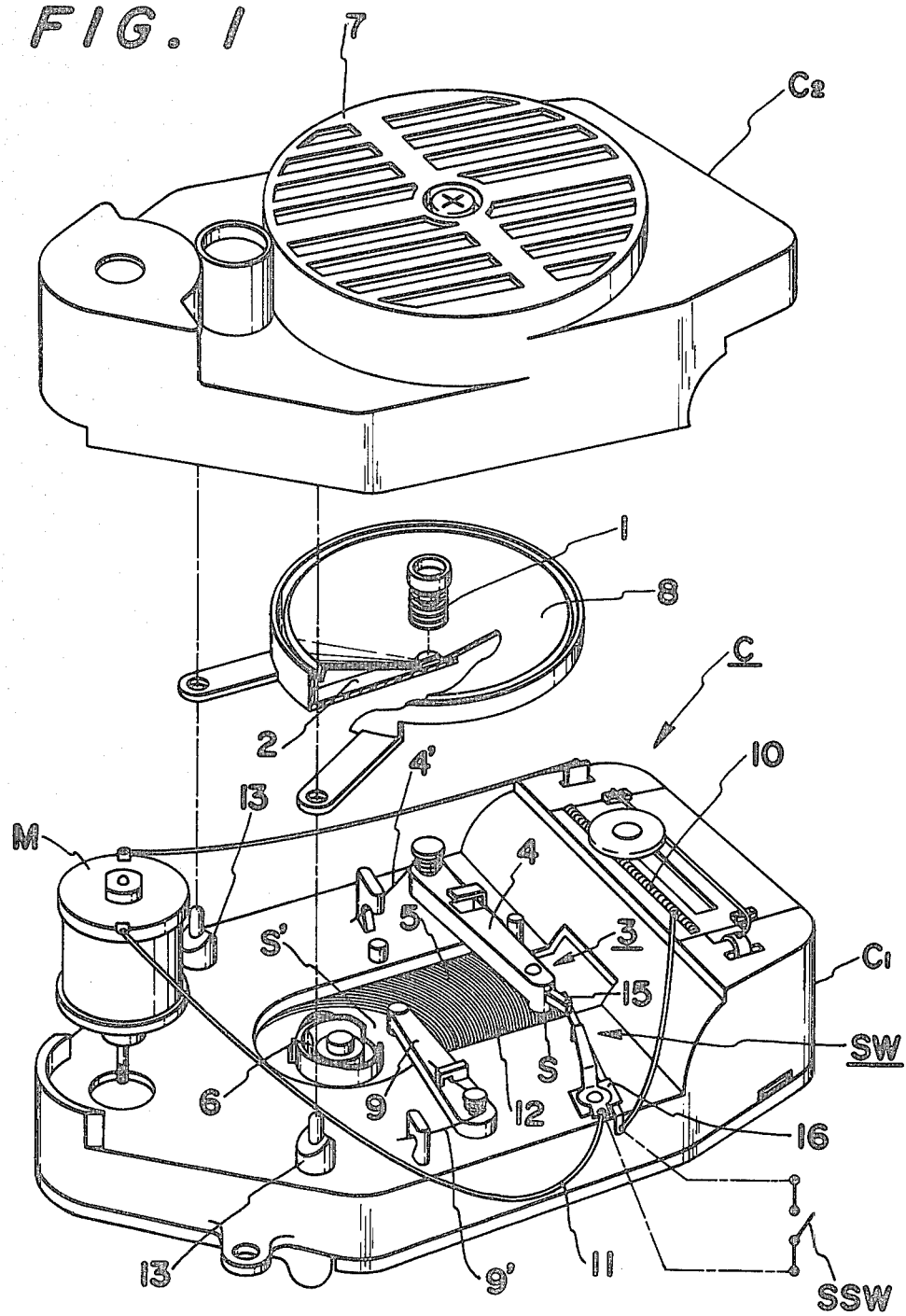
FIG. 1 is an exploded perspective view showing an entire sound reproducing device in accordance with the present invention.

With reference to FIG. 1, casing C comprises a chassis $C_1$, and a housing $C_2$ in which is provided a speaker box 7. On the chassis $C_1$ there is provided a motor M, a speaker 8, a tone arm 4, a swingable arm 9 for scooping up the sound transfer member described hereinbelow, a resistor-type speed controller 10, and an electrical circuit 11 similar to those provided in most conventional sound reproducing devices.

A part of the upper plate of chassis $C_1$ is cut away in an area surrounding the pickup 3 of the tone arm 4 to define an opening passage for the stylus.

The tone arm 4 is pivotably attached at one end thereof on the upper plate of the chassis $C_1$ and is capable of being swingably moved in both horizontal and vertical directions. Tone arm 4 is always resiliently urged by a return spring 4' toward its initial or starting position of sound reproduction.

The swingable arm 9 is also pivotably attached on chassis C, and is capable of moving both in horizontal and vertical directions. The swingable arm 9 is also biased toward the starting point S of sound reproduction by means of a return spring 9'. Swingable arm 9 is disposed such that the forward end thereof takes its position between the tone arm 4 and the cam 6.

An upright cam 6 is disposed at the center of rotation of a record disc 5 and is adapted to rotate therewith.

Figure 3:
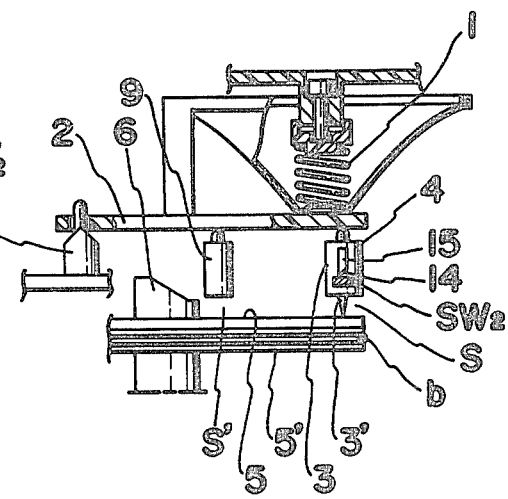
FIG. 3 is a front view of the FIG. 1 device.

As shown in FIG. 3, the record disc 5 is integral with, or detachably placed to rest upon, a turntable 5' which is driven by the motor M through a belt b extended around the turntable 5'.

Upon arrival of tone arm 4 to the terminal point of its sound reproduction, tone arm 4 will push the swingable arm 9 to ride on the cam surface of cam 6, further rotation of which acts to scoop the swingable arm 9 upwardly.

As shown in FIGS. 1 and 3, the chassis $C_1$ supports a sound transfer member 2 supported by a pair of upright posts 13. The sound transfer member 2 is capable of being moved vertically, and a free end thereof is placed to rest on the pickup 3 of tone arm 4.

A speaker 8 is attached to the upper surface of the free part of sound transfer member 2 such that the two members comprise an integral unit.

A coil spring 1 for imparting necessary stylus force is placed such that it is compressed between the bottom of speaker 8 and speaker box 7 so as to resiliently urge sound transfer member 2 toward record disc 5 and in turn urge tone arm 4 against the record. Thus, the stylus 3' is able to engage with the grooves of the record disc under the appropriate stylus force.

While the pickup portion 3 travels toward the terminal point S' of sound reproduction due to the rotation of record disc 5, the pickup portion 3 senses and transfers the vibration to sound transfer member 2 when it slidably contacts with the lower surface of sound transfer member 2. Vibrations transmitted to sound transfer member 2 are amplified by the speaker 8 into audible sounds.

When the pickup 3 approaches the terminal point S' of sound reproduction, it pushes the swingable arm 9 to ride on the cam 6 such that further rotation of cam 6 may scoop up swingable arm 9. In turn, sound transfer member 2 is raised to be released from imparting the stylus force to tone arm 4. Next, the tone arm 4, by means of return spring 4', is caused to move such that its pickup portion 3 can be reverted back or returned to the starting or initial point of sound reproduction.

Upon returning of tone arm 4 to starting point S, the swingable arm 9 is released from the pushing force given by tone arm 4 against the resilient force of return spring 9' and further is released from support by cam 6 and moves away from cam 6 as cam 6 further rotates. Thus, the sound transfer member 2 descends while being urged by the force of stylus force spring 1. By descending of sound transfer member 2, tone arm 4 also descends so that its pickup 3 may be urged down toward record disc 5.

At the tip end of pickup portion 3 there is provided a sharp edged projection 15 having a slant face 14, facing the starting point S of sound reproduction.

Figure 4:
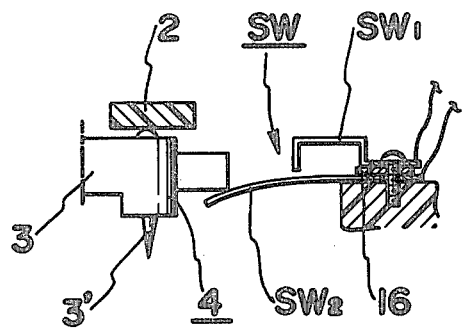
FIG. 4 is a side elevational view showing a relation between the pickup and a switch means of the present invention.

As shown in FIG. 1, a switch means SW for closing and opening a circuit from the driving motor M to a power source is mounted as further shown in detail FIG. 4.

The switch SW comprises a fixed contact blade S and a movable contact blade $SW_2$ placed in vertical opposed relation to each other, in the same direction that of the stylus force.

An insulator 16 is interposed between the upper fi contact blade $SW_1$ and the lower movable contact bl $SW_2$ and is adjusted to contact the fixed contact bl $SW_1$ with a resilient force of approximately one-half the desired stylus force.

The pickup 3 of tone arm 4 having been automatica returned to the starting position S is situated at a p tion at which projection 15 thereof is disposed abc the forward part of movable contact blade $SW_2$.

When the pickup portion 3 descends by a depressi force given by sound transfer member 2, the projecti 15 abuts with movable contact blade $SW_2$ such that downward movement is partly cushioned, and th descends further until the stylus 3' engages with rec disc 5. Thus, the movable contact blade $SW_2$ mo away from contact with fixed contact blade $SW_1$, a the electrical connection from the electric source interrupted.

The switch SW is also connected to a bypassed st switch SSW so that motor M may start rotation up closing start switch SSW and tone arm 4 also begins travel toward the end or terminal point S' of sou reproduction.

Slight advancement of tone arm 4 due to its tra causes projection 15 of pickup 3 to move away fr engagement with the upper surface of movable cont blade $SW_2$, and thereby the movable contact bla $SW_2$, by means of its strong spring property, reve back to engagement with fixed contact blade $SW_1$. T motor M is thus able to rotate even if the start swit SSW is opened or placed in the OFF position.

Figure 2:
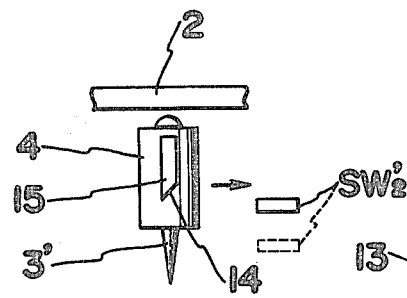
FIG. 2 is a front view showing a pickup and a movable contact.

By virtue of the above-described construction, t switch SW permits a stable electrical connection due its low electrical resistance ensured by strong cont pressure between the two mating blades $SW_1$ and $SV$ As can be seen from FIG. 2, the slant surface 14 projection 15 provided on pickup 3 facilitates rea engagement of projection 15 with movable cont blade $SW_2$ even if there is some misalignment betwe the two mating members.

Figure 5:
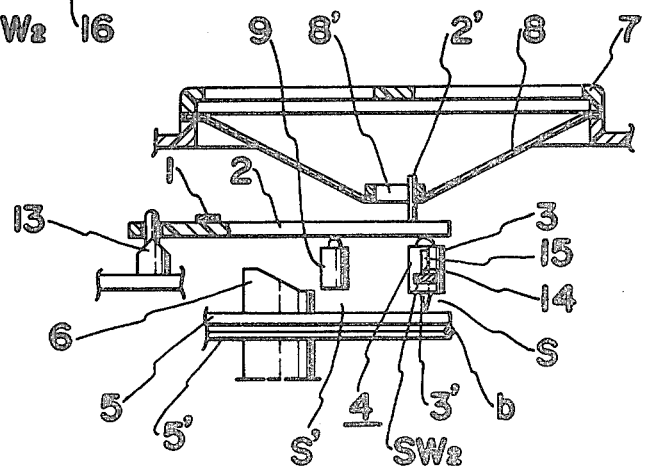
FIG. 5 is a schematic front view showing another embodiment of the present invention.

FIG. 5 shows another embodiment of the pres invention, wherein a speaker 8 is fixed to a speaker b 7, and a sound transfer member 2 is provided separate from the speaker 8 and is capable of being swingal moved up and down. An upright post 2' is provided sound transfer member 2 and is engaged with speake at an interior peripheral portion 8' of a bottom openi of speaker 8.

In the FIG. 5 embodiment, when tone arm 4 autom ically returns to the starting point S of sound reprodt tion, projection 15 urges movable contact blade $SV$ downwardly by means of a spring 1 for imparting t necessary stylus force in a similar manner as describ in the foregoing description of the FIG. 1 embodime In this embodiment, the spring 1 comprises a l spring supported on chassis $C_1$ in a cantilever fashic and the free end thereof resiliently engages with sou transfer member 2 at its upper surface near the termi point S of sound reproduction.

When the present invention is applied to a simplifi record player wherein the record is changed by openi the bottom lid of the casing, the record disc is ded away from its reproducing position when the bottom lid is opened. The stylus force is thereby reled so as to allow the tone arm to immediately return he starting position and to thus push down the movable contact blade of the switch means.

It is contemplated that the present invention may be applied to record players of the non-changeable record type.

I claim:

1. A simplified record player comprising:
    a casing having a sound transfer member cantilever-mounted thereon;
    a stylus force spring means resiliently cooperating with said sound transfer member;
    a tone arm pivotably mounted at one end thereof to said casing and having a pickup supported by the other end thereof
    said pickup being provided with a stylus;
    said tone arm being disposed under said sound transfer member;
    an upper face of said pickup being adapted to slidably contact the lower face of said sound transfer member;
    said stylus being adapted to be resiliently urged by said sound transfer member to engage with sound grooves of a record disc;
    a cam disposed substantially at the rotational center of said record disc;
    said cam cooperating with said sound transfer member to upwardly lift said sound transfer member when said pickup reaches the terminal point of sound reproduction of said record disc and to permit said stylus to disengage from said sound grooves and to return back to the starting point of sound reproduction;
    an electric power source and an electric motor for driving said record disc, said power source and said motor being connected by an electric circuit;
    a switch cooperating with said pickup so as to be opened by said pickup when said pickup returns to said starting point to interrupt an electrical connection in said electric current;
    said switch including a fixed contact and a movable contact disposed in substantially vertically opposed relation against each other substantially in the same direction as that of said stylus force;
    said movable contact and said tone arm operatively communicating with each other such that said tone arm is disposed above the upper face of said movable contact when said tone arm is returned to said starting point and said tone arm pushes said movable contact downwardly against a spring force, away from engagement with said fixed contact, so as to interrupt said electrical connection and moderate rapid impinging of said stylus on said record disc.

2. A simplified record player according to claim 1, wherein:
    said movable contact is positioned so as to be pushed down by said pickup of said tone arm.

3. A simplified record player according to claim 1 or claim 2, wherein:
    a projection having a slant surface facing toward said starting point of sound reproduction is disposed above said movable contact and is adapted to push down said movable contact.

4. A simplified record player according to claim 1, wherein:
    said record player is of a record-changeable type wherein a face of said record disc having said sound grooves thereon is descended away from the sound reproducing position thereof.

5. A simplified record player according to claim 1, wherein:
    said record disc is unchangeable.

6. A simplified record player according to claim 1, wherein:
    said sound transfer member is integrally secured to a speaker of said record player.

7. A simplified record player according to claim 1, wherein:
    said sound transfer member is substantially separated from a speaker of said record player; and
    said sound transfer member is provided with a post extending upwardly therefrom into engagement with an interior peripheral portion of said speaker.

* * * * *